(12) United States Patent
Moskowitz et al.

(10) Patent No.: US 6,662,215 B1
(45) Date of Patent: Dec. 9, 2003

(54) SYSTEM AND METHOD FOR CONTENT OPTIMIZATION

(75) Inventors: Howard Moskowitz, White Plains, NY (US); Alexander Gofman, Cortland Manor, NY (US)

(73) Assignee: I novation Inc., White Plains, NY (US)

( * ) Notice: Subject to any disclaimer, the term of this patent is extended or adjusted under 35 U.S.C. 154(b) by 736 days.

(21) Appl. No.: 09/613,135

(22) Filed: Jul. 10, 2000

(51) Int. Cl.[7] ................................................ G06F 15/16
(52) U.S. Cl. ........................ 709/217; 709/203; 709/205; 709/219; 705/10; 705/14; 707/10
(58) Field of Search ................................. 709/203, 205, 709/217, 219; 705/10, 14; 707/10

(56) References Cited

U.S. PATENT DOCUMENTS

| | | | |
|---|---|---|---|
| 5,696,965 A | 12/1997 | Dedrick ........................ 707/10 |
| 5,832,457 A | 11/1998 | O'Brien et al. ................ 705/14 |
| 5,835,087 A | 11/1998 | Herz et al. .................... 345/810 |
| 5,937,037 A | 8/1999 | Kamel et al. ............. 379/88.19 |
| 5,963,910 A * | 10/1999 | Ulwick ........................... 705/7 |
| 6,055,513 A | 4/2000 | Katz et al. ..................... 705/26 |
| 6,076,068 A | 6/2000 | DeLapa et al. ................ 705/14 |
| 6,185,614 B1 | 2/2001 | Cuomo et al. ............... 709/224 |
| 6,430,539 B1 * | 8/2002 | Lazarus et al. ................ 705/10 |

\* cited by examiner

*Primary Examiner*—Nabil El-Hady
(74) *Attorney, Agent, or Firm*—Kenyon & Kenyon

(57) ABSTRACT

A communication method for communication between a user computing device and a first server arrangement includes the steps of: transmitting a communication, which includes data representing a characteristic of the user of the user computing device, from the first server arrangement to a second server arrangement; selecting a population segment in accordance with the user characteristic; determining a content in accordance with the user characteristic; transmitting a first response, which includes data representing the determined content, from the second server arrangement to the first server arrangement; and transmitting a second response, which includes at least the determined content, from the first server arrangement to the user computing device. The content corresponds to a plurality of concept elements. The method may be embodied in a computer-readable storing medium or in a computer system.

72 Claims, 6 Drawing Sheets

SYSTEM AND METHOD FOR CONTENT OPTIMIZATION

FIELD OF THE INVENTION

The present invention relates generally to the field of content optimization.

BACKGROUND INFORMATION

Heretofore, attempts have been made to transmit direct marketing or other targeted content to customers, potential customers or other end users or targeted groups or targeted individuals. Conventional techniques range from the most basic, and highly ineffective, to the more sophisticated, but still relatively ineffective. Effectiveness, in the present context, may be measured by relating the response to the transmission. For example, if 10,000 items were transmitted and ten responses to that transmission were received, one measure of effectiveness is to divide the number of responses to the number of items transmitted (i.e., 10/10,000=0.1 %). Alternatively, the cost of transmitting the items and the sales generated as a result thereof may serve as the basis of the effectiveness calculation.

Direct mass mailing is but one example of conventional attempts to deliver targeted materials. In its crudest form, an item, such as, for example, a catalog, an announcement, a brochure, a credit card application, a flier, a letter or any other type of communication, is sent to every household in a particular geographic area. Given the diverse population in nearly every community, the response rate to such a mass mailing is typically very low, thereby rendering the mass mailing technique highly ineffective. Certainly, the particular geographic area may be selected in an attempt to target particular demographic of that area. However, no community has such a homogeneous population to render a mass mailing truly targeted.

Additionally, mass mailings are transmitted more to the dwelling than the person or persons residing in that dwelling.

The advent of the Internet has spawned a desire to target Internet users with targeted materials, including advertising, electronic mailings and other customized content. Traditionally, web site publishers either randomly select ads or "banners" for placement on its pages or apply some primitive algorithm for the selection of such materials for placement on its pages. For example, an algorithm has been used to select one of a plurality of different content elements for placement on a page, wherein the particular element selected is based on a simple counter or other simple cycle (e.g., the element changes every n-th visitor, hit, etc.). Alternatively, web site publishers have employed "cookies" to maintain a customer profile. The profile may be based on that particular customer's history of purchasing items from that particular web site publisher. The profile may additionally be based on which pages that particular customer has previously used. This profile may then be used by the web site publisher in an attempt to target content to that particular user. However, the conventional approaches mentioned above lack methods to implement truly targeted campaigns based on a combination of normative data for each category of products and/or services, in conjunction with the individual preference profile of the user. Existing systems may allow sites to decide on the relevance of the messages or ads. For example, message A may be highly relevant to young females, whereas message B may be highly relevant to middle-aged males. This judgment is performed subjectively based on very limited user information, generally without regard to any content-based optimization for a population segment to which the user most likely belongs. The disadvantages of the current approaches are: (i) the messages (content) are not optimized to appeal to the specific person; (ii) the selection of the content is neither optimized nor fine-tuned based on the quantity of information about the user; and (iii) any decision regarding the relevance of the content is not based on a foundation of a normative database for a specific product and/or service category. In short, conventional techniques fail to accurately target a message or other content to particular individuals.

It is therefore an object of the present invention to provide a system and method for providing targeted content to an individual. It is an additional object of the present invention to provide a system and method for optimizing the targeted content to the individual.

SUMMARY OF THE INVENTION

The above and other beneficial objects of the present invention are most effectively attained by providing a system and method as described and claimed herein. In one embodiment, the method includes steps of: transmitting a first data request from a user computing arrangement to a first server arrangement via a communications network; transmitting a second request communication from the first server arrangement to a second server arrangement, the second request communication including data representing at least one characteristic of the user of the user computing arrangement; selecting one of a plurality of population segments in accordance with the user characteristic; determining a content, which corresponds to a combination of concept elements, in accordance with the selected population segment; transmitting a first response communication, which includes data representing the content, from the second server arrangement to the first server arrangement; and transmitting a second response communication, which includes at least the determined content, from the first server arrangement to the user computing device. The method may be embodied in a computer-readable storing medium or in a computer system.

A computer system according to the present invention includes a user computing arrangement, a first server arrangement and a second server arrangement. The user computing arrangement is configured to transmit a first request communication to the first server arrangement via a communications network. The first server arrangement is configured to transmit a second request communication, which includes data representing at least one characteristic of the user of the user computing arrangement, to the second server arrangement. The second server arrangement is configured to select a population segment in accordance with the user characteristic and to determine a content, which corresponds to a combination of concept elements, in accordance with the selected population segment. The second server arrangement is configured to transmit a first response communication to the first server arrangement, the first response communication including data representing the determined content. The first server arrangement is configured to transmit a second response communication to the user computing arrangement via the communications network. The second response communication includes at least the determined content.

DETAILED DESCRIPTION

Figure 1:
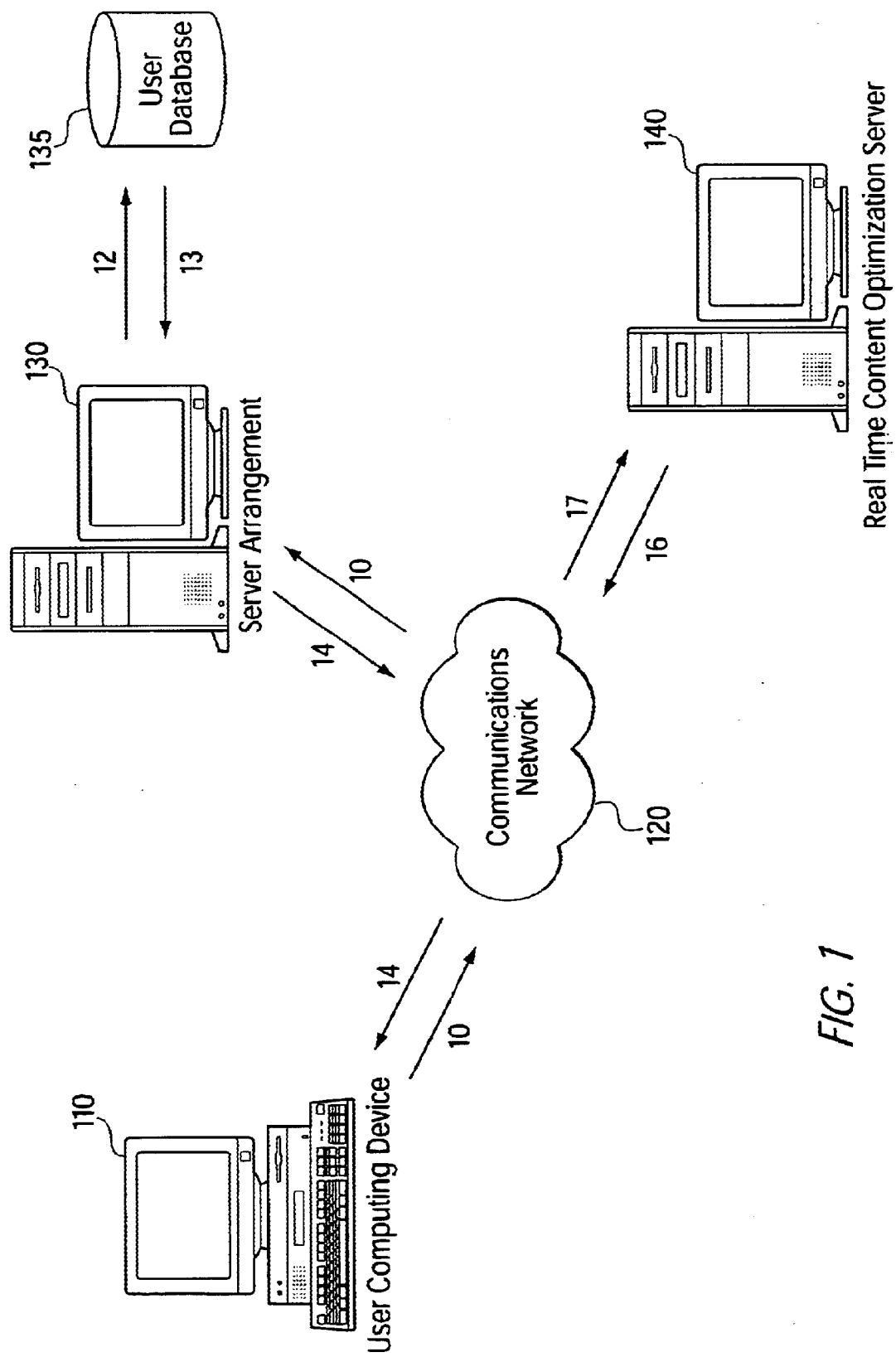
FIG. 1 shows an exemplary embodiment of a Real Time Content Optimization (RTCO) system according to the present invention.

Those skilled in the art will gain an appreciation of the present invention from a reading of the following description when viewed in conjunction with the accompanying drawings of FIGS. 1–7, inclusive. The individual reference characters designate the same or similar elements throughout the several views.

The present invention relates to a system and a method for content optimization. For example, a Real Time Content Optimization ("RTCO") system may be used to determine to which specific "flavor" of content (e.g., an advertisement) a specific visitor of a web site is likely to respond. This determination is made with reference to the "algebra of that particular consumer's mind." The system may also be applied to any content selection, such as, for example, visual and/or text elements of a web page, based on a segmentation of the consumers.

FIG. 1 shows an exemplary embodiment of a RTCO system 100 according to the present invention. The RTCO system 100 may include a server arrangement 130, a real time content optimization server (RTCO server) 140, at least one user computing arrangement or device 110, a user database 135 and a communication network 120. The communication network 120 may be an arrangement of nodes and connecting branches for a data exchange. For example, the communication network 120 may include the Internet, an intranet, an extranet, a wide area network, a local area network, a computer network, a virtual private network, a metropolitan area network, a satellite network, a wireless network, or any other arrangement of nodes and connecting branches for data exchange.

The server arrangement 130 may be a conventional server or a computing device that includes a storage device, a processor and a communication device. The server arrangement 130 stores web pages, information and/or data necessary to generate such web pages.

The user computing device 110 may be a conventional computer, a handheld computing device, a mobile phone, an alphanumeric pager or the like. The computing device. 110 may include a processor, a random access memory (RAM), a storage device and a communication device. The communication device may be a modem-like arrangement, a network card or any other wired or wireless device capable of sending and receiving communications via the communication network 120. Such communications may include, for example, sending and receiving web pages with marketing and/or other content. In addition, the user's name, geographic location, and information about the user device 110 and/or programs of, stored in or used by the user device 110 may be transmitted during the communications. The user device 110 may also process responses from the communication network 120 using the processor and store such responses permanently or temporarily in a RAM or other storage device.

Figure 2:
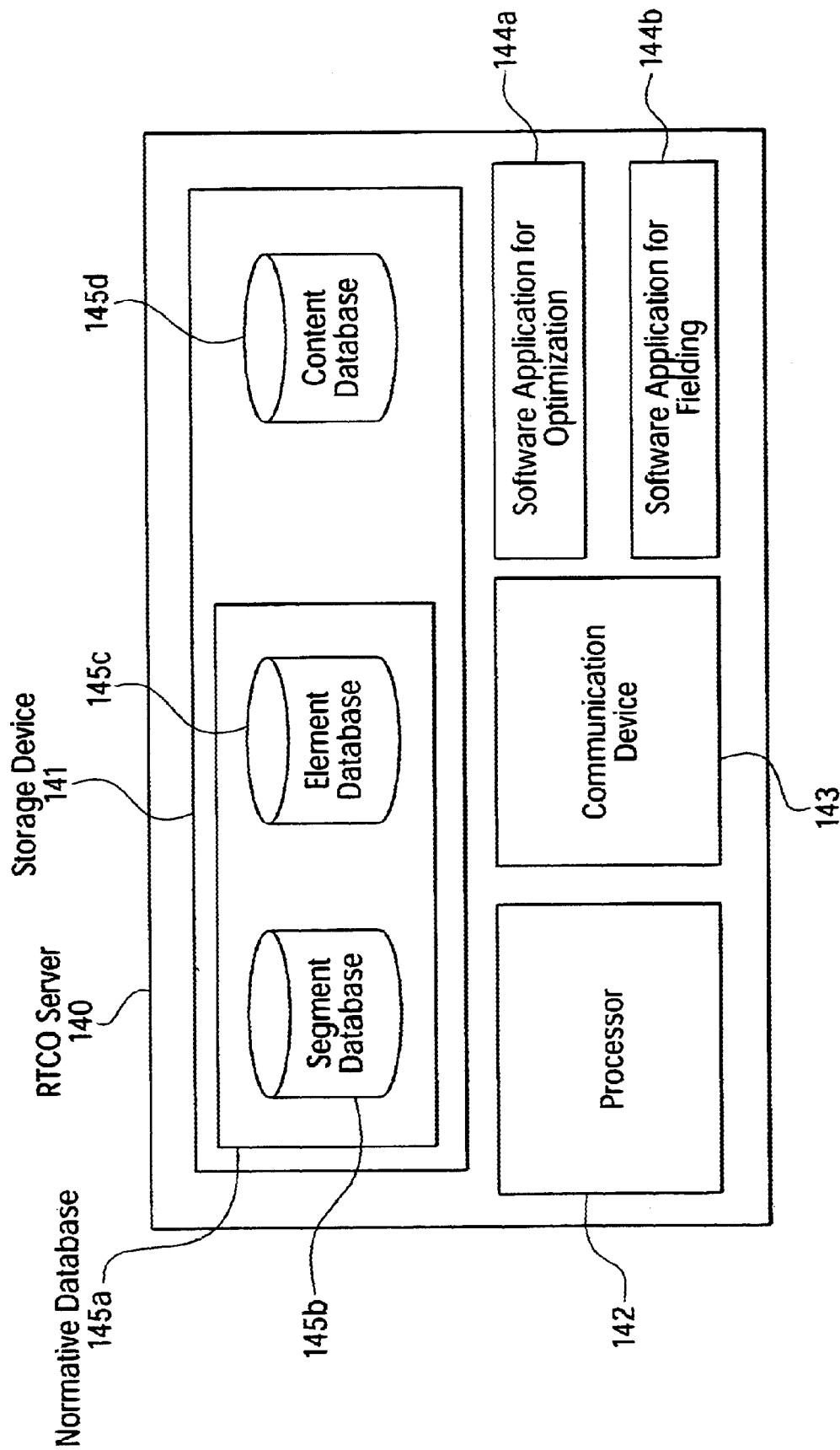
FIG. 2 shows an exemplary embodiment of a RTCO server according to the present invention.

The RTCO server 140 may also be a conventional server or a computing device, which, as shown in FIG. 2, includes a storage device 141, a processor 142 and a communication device 143. The storage device 141 may store a plurality of databases, e.g., a normative database 145a and a content database 145d. The normative database 145a may consist of such components as segment database 145b and element database 145c. The function of the RTCO server 140 will be described with reference to the example below and shown in FIG. 2. It should be appreciated that although RTCO server 140 is shown as a single server unit, RTCO server 140 may include numerous server units, computers or devices and that RTCO server 140 may include a network of such server units, computers or devices.

The user database 135 may include information with respect to each user. Such information may include demographic information, attitudinal information or the like. Demographic information may include, for example, data regarding the user's age and gender. Attitudinal information may include, for example, data relating to the user's political party affiliation (more conservative vs. more liberal) or the like. This user information may be generated, for example, from three sources. Depending on the source and the amount of the user information, a different decision rule may be applied. First, the user information may be generated from responses provided by the user to a set of questions and/or other stimuli. Such information may be collected in real time and may be sufficient to "place" the user into an appropriate market segment. A second source of user information may be an identification code that is assigned to the user and that links the user to an entry in other User Databases with additional information. The identification code may be for example, the user's membership number. A third source of user information may be prior behavior that is obtained from one or more cookies or the like that are stored or otherwise contained in the user device 110 or on the server 130.

The normative database 145a may include normative information, which is obtained using a conjoint measurement. The normative database 145a may be created in advance, with a group of consumers. This group of consumers may be separate from the group of consumers who are ultimately to be targeted and who are to be the ultimate recipients of the optimized content. The normative database 145a may be updated on a scheduled basis and may contain information regarding various product groups, services, knowledge areas, political platforms and the like. Normative database 145a may include separate information regarding, for example, sports cars, family sedans, yogurt products, wireless services and the like. It should be appreciated that the more specific the information contained in the normative database 145a, the more that information will allow for the generation of content targeted to an individual, who will be the ultimate recipient of the targeted content.

The normative database 145a may include segment database 145b and element database 145c. For example, a group of users participate in a study, which requires evaluating a variety of combinations of concept elements. The concept elements may relate to a particular product, service or other topic. Each product, service or other topic may require its own normative database, which contains concept elements appropriate for the corresponding product, service or other topic. Results of the study are processed to yield an individual model showing the contribution of each concept element to the particular user's interest in the corresponding product, service or other topic. This user information permits clustering of individuals in the normative database into segments by using a clustering algorithm. The process of creating normative database 145a may be performed prior to its use in real time content optimization.

The segment database 145b may include descriptions and definitions of the segments and rules of defining the manner of placing a consumer in one of the segments. Such rules may include, for example, a decision tree or a pattern matching system. Multiple sets of segments may be present for each category of the product, service, political platform, etc. Depending on the quantity of information about a consumer, RTCO server 140 may choose the proper set of segments and may place the consumer in one of such segments. Thus, the more information about a consumer obtained the finer the "granularity" of segments (i.e., more segments from which to choose). If the information is very limited, the "granularity" may be coarse (fewer segments from which to choose). If there is no information about a consumer (or the information is not conclusive), then there may be a default option. The default option may be, for example, a generic content optimized for general population, which is still better than a non-optimized content.

The content database 145d may include marketing content, advertisements, different executions of web pages, statement or any other content. The content database 145a may be located on RTCO server 140, on the server arrangement 130 or distributed therebetween. If the content database 145a is distributed between RTCO server 140 and server arrangement 130, then the portion of content database located on RTCO server 140 may contain simply links to the real content located on server arrangement 130 or may contain a code to access the content. Such content may be predefined by a provider of the content. The predefined content may be, for example, a ready-to-use advertisement.

There may be several executions of the content. These executions may be created based on the normative database 145a. The normative database can yield optimized concepts to create more targeted content. Each of the executions (e.g., optimized concepts, banner ads, web pages or the like) may have a segment or subgroup associated with it.

If the executions of the content are not created based on the optimal concepts from the normative database 145a, then each of the executions could be otherwise matched to the existing segments. This matching may be performed by use of an algorithm that matches the attribute profile of the execution to the optimal attribute of a concept that would be desired by that segment. For example, the semantic profile corresponding to the execution would be matched to the semantic profile of the optimum concept for each segment. There are, of course, different ways to achieve this result. One example is to dimensionalize the execution by a set of respondents on non-evaluative semantic differential scales and subsequently match the semantic profile of the execution to the semantic profile of the optimized concept from normative database 145a. Alternatively, the executions may be rated on an evaluative and/or a non-evaluative scale by a set of respondents who have been selected from the normative database 145a and who are known to be members of a specific segment. Thus, respondents who participated in the initial projects that created the normative database may be invited back for evaluation of the execution based on their membership in the segments.

In addition, the content database 145d may include concept elements that may be used to generate dynamic content, in real time, based on a predefined criteria and/or format.

The element database 145c may include a plurality of existing content elements that may be utilized to study a group of users. The element database 145c may also contain individual scores of the elements based on the conjoint measurement defining what each element "contributes to interest" (as a result of fielding the projects). The concept elements may be combined into a set of concepts to be presented to a group of users prior to content optimization (population of normative database). The concepts may be generated in real-time or predetermined in advance.

Also, the storage device 141 may contain a software application 144b for creating, updating and maintaining materials associated with one or more of the several databases. For example, the software application 144b may automatically present stimuli (concepts) to respondents during fielding of the projects (population of normative database 145a). Also, the storage device 141 may contain a software application 144a for content optimization. For example, the software application 144a may automatically generate the content by following a specific decision rule and combining elements into an advertisement or other content-based message, either in real-time, for the individual user (based on segment membership), or ahead of time for the each of the segments.

As shown in FIG. 1, the user may utilize the user computing device 110 to generate a first request 10 to receive, for example, a web page that has a particular content. The web page is stored (linked or dynamically generated) on the server arrangement 130. The user computing device 110 sends the first request 10, via the communication network 120, to the server arrangement 130.

The server arrangement 130 receives the first request 10 for the web page. Generally, the web page consists of: (i) a particular static content requested by the user that is stored and/or generated by the server arrangement 130; and (ii) the dynamic optimized content that may be generated by RTCO server 140. The server arrangement 130 retrieves and/or generates the particular static content, obtains relevant information about the user from user database 135 (through request 12 and response 13) and sends a second request 17 for the dynamic optimized content to RTCO server 140 together with available information about the user. This information may be supplied in the form of values of the predefined set of parameters (for example, answers to a predefined set of attitudinal questions asked during registration) or some codes that may be used to place a user into one of the segments stored in segment database 145b. Each possible set of information available about a user may have separate codes, which may be mapped to one of the different sets of segments with proper "granularity."

Figure 3:
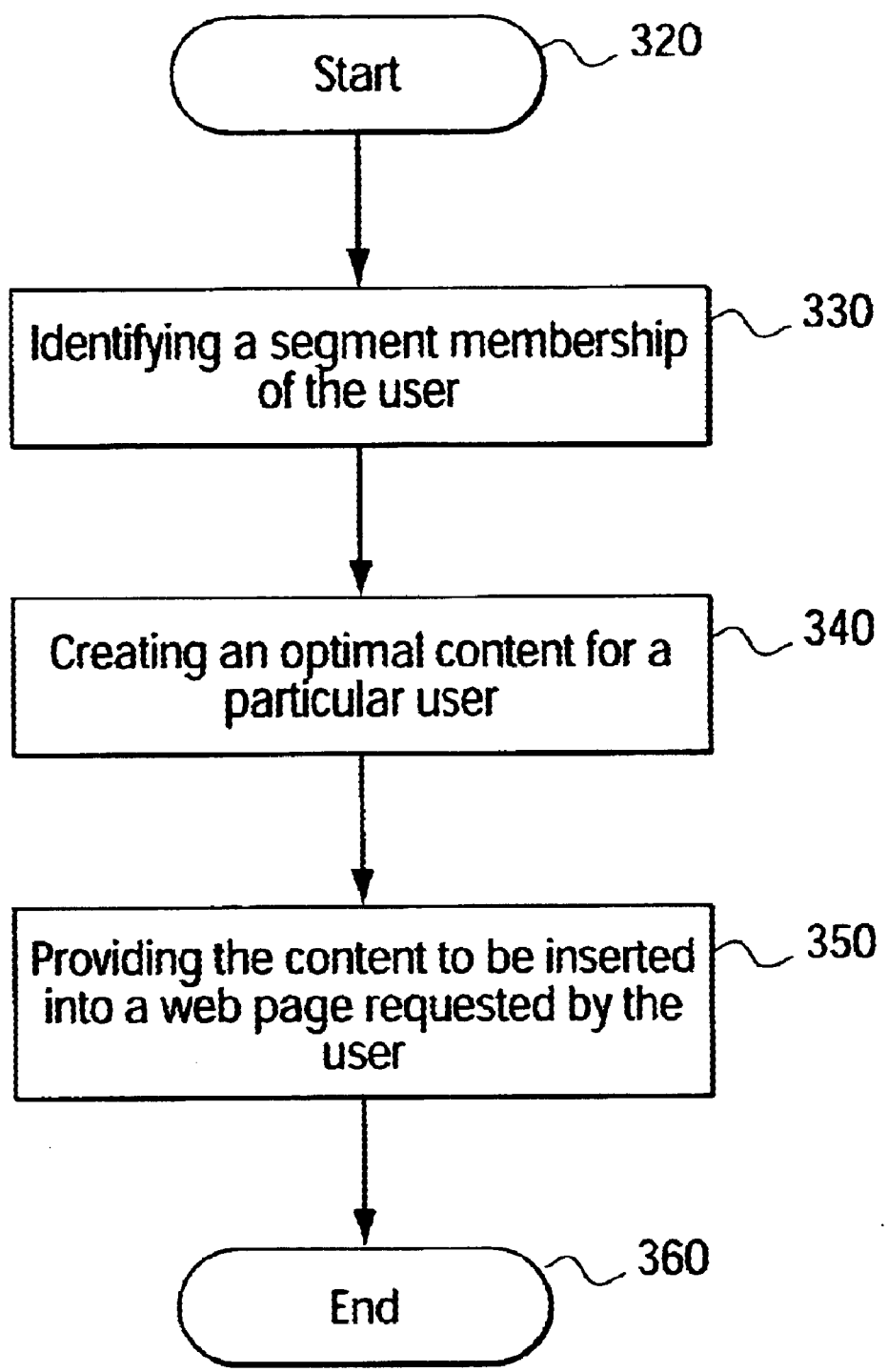
FIG. 3 shows a flow chart illustrating an exemplary method according to the present invention.

The RTCO server 140 receives the third response 17 to determine segment membership of the user. This determined segment membership may be used to generate the dynamic optimized content for the web page that would be relevant for this particular user. As shown in FIG. 3, in order to generate such dynamic material, the software program 144a identifies the segment membership of the user using: (i) a predetermined decision rule from the normative information database 145*a*; and (ii) the user information from the user database 135 (step 330). Then the software program 144*a*, based on the segment membership of the user that is stored in the segment database 145*b*, creates the optimal dynamic content for the user using the content database 145*d* (step 340). The dynamically optimized content may be generated in real time. Alternatively, the dynamically optimized content may be predetermined and simply chosen dynamically. The dynamic content is inserted into a first response 16, which is sent to the server arrangement 130 (step 350).

Upon receiving the first response 16, the server arrangement 130 generates the web page, which includes both the particular static content requested by the user and the dynamically optimized content. The web page is inserted into a second response 14 that is forwarded, via the communication network 120, to the user device 110.

Figure 4:
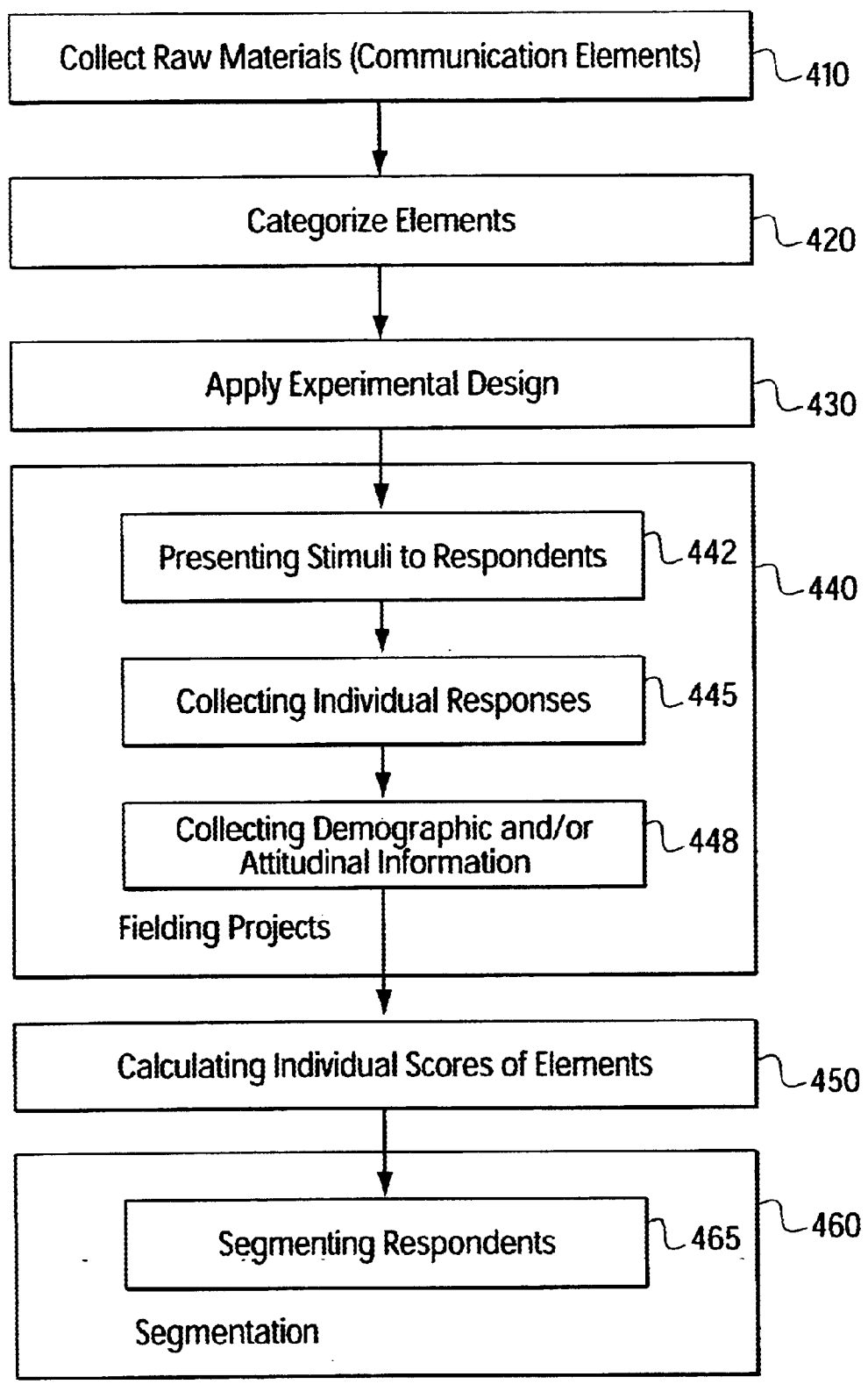
FIG. 4 shows a flow chart illustrating an exemplary method of collecting normative information according to the present invention.

FIG. 4 shows a flow chart illustrating an exemplary method of collecting normative information (i.e., elements scores) according to the present invention. First, raw materials (i.e., communication elements) are collected (step 410). These communication elements may include product features, prices, multimedia, names, benefits, other messages or the like. (e.g., parsing current ads, media, political platforms, conducting ideation group, etc.). In step 420, the communication elements are categorized by placing similar elements into categories (e.g., benefits may be placed in one category, and names may be placed in another category).

Next, an experimental design is applied to the categorized elements, and the elements are prepared for a fielding process (step 430) by putting together elements into set of concepts according to an experimental design (for example, Plackett Burman, Latin Square or any other factorial or fractional factorial designs). The fielding process (step 440) consists of: (i) presenting the concepts to a set of respondents (step 442); (ii) collecting from the respondents ratings for concepts (stimuli) on a person-by-person basis on one or more questions (attributes, such as liking, purchase intent, interest, etc.) (step 445); and (iii) collecting some demographic information (such as geographic location, household income, age, occupation and the like), attitudinal and/or other information (step 448) using the software application for fielding 144*b*, which may be located on a separate server for building normative database 145*a*. After the fielding process is completed, the values of individual scores of elements are calculated (step 450). This calculation may be performed by running a regression or by other methods. The individual models are linked with the demographic and/or attitudinal information. In addition, responses to several questions about lifestyles and values may be collected. This lifestyle and value information may be used to link to the individual models. This step may help to discover individual "hot buttons" for each person. "Hot buttons" correspond to the top scored elements and may include the most appealing messages. For example, for the credit card category, hot buttons may include the interest rate, a cash rebate for a balance transfer or the like. Finally, the respondents are segmented (step 460, 465). Segmenting the respondents may include identifying groups of the respondents who are similar to each other based on their respective responses to similar elements.

Figure 5:
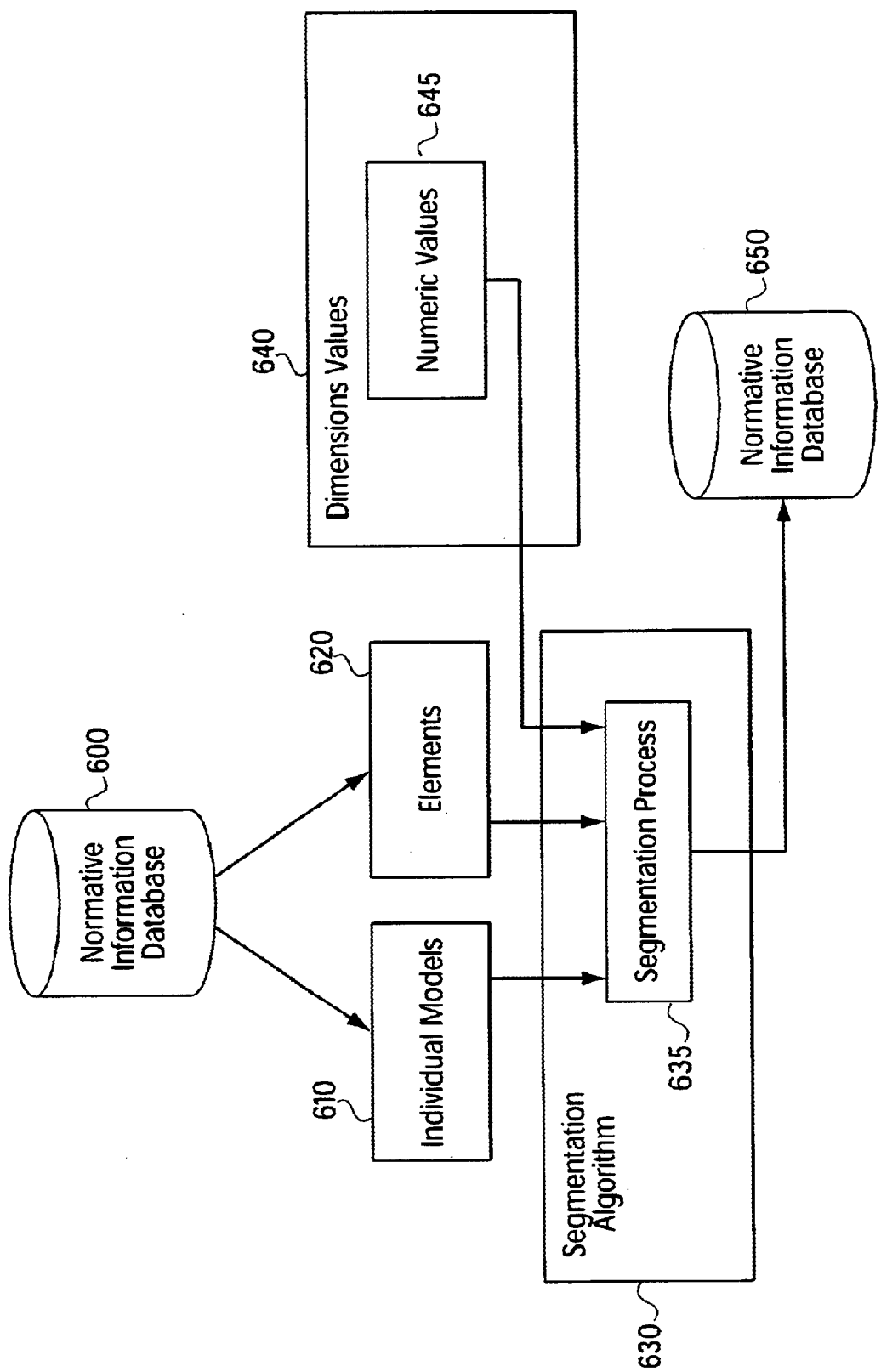
FIG. 5 shows an exemplary method of segmentation to collect normative information according to the present invention.

FIG. 5 shows an exemplary method of segmentation to collect normative information according to the present invention. The segmentation may be used to organize the information in the normative database 145*a* (block 600). The information in the normative database includes individual models (block 610) arid elements (block 620). This information is analyzed using a segmentation algorithm (block 630). The segmentation algorithm includes a segmentation process (block 635) in which the individual models (block 610) of the respondents on the different elements (block 620) are combined with dimensions values (block 640). The dimensions values may include numeric values (block 645) positioning each element on a pre-defined semantic differential scale in order to divide the individuals by the pattern of their utility values in the segmentation process (block 635). The semantic scales are relevant to the product or service category. For example, in the case of the credit card category, scales might be as follows: (i) Scale #1: more for males vs. more for females; (ii) Scale #2: more for business use vs. more for personal use; (iii) Scale #3: for affluent purchasers vs. for lower income purchasers. Each concept element is scaled on the full set of semantic scales by individuals similar to those who will generate the normative database. The utility values are the result of modeling using, for example, Dummy Variable regression. Utility value describes the importance of the element in a concept. In case of "Liking" question, utility value represents how much respondents liked (or disliked) the element. Higher positive number represents more "liking." Negative values represent "disliking". Each segment, demographic subgroup or individual has different patterns of average utility values for the elements. In a preferred embodiment, the segmentation process includes a segmentation algorithm to divide the customers by the pattern of their utility values and then stores the result in the normative information database (block 650).

Figure 6:
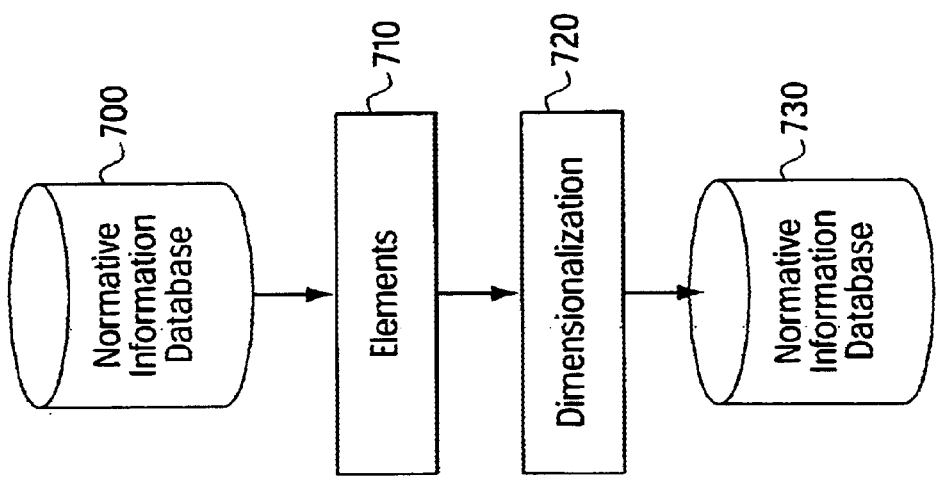
FIG. 6 shows an exemplary method of adding dimension values to a normative information database according to the present invention.

FIG. 6 shows an exemplary method of adding dimensions values to the normative information database according to the present invention. To dimensionalize the normative information database 145*a* (block 700), the elements (block 710) are presented in a sequence (in a randomized order for example) and then undergo dimensionalization (block 720) in which each of the elements in the study is located on a set of non-evaluative semantic differential scales. In a preferred embodiment, the user rates all elements on one dimension at a time (a semantic scale). This ranking may be "an anchored 1 to 9" scale. The dimensionalization (block 720) generates a profile of each element on a set of scales that can be viewed as the element communication profile. The communication profile may be used to guide the segmentation and direct the optimized communication in a pre-specified direction (tonality). The dimensions values are stored in the normative information database 145*b* (block 730).

Figure 7:
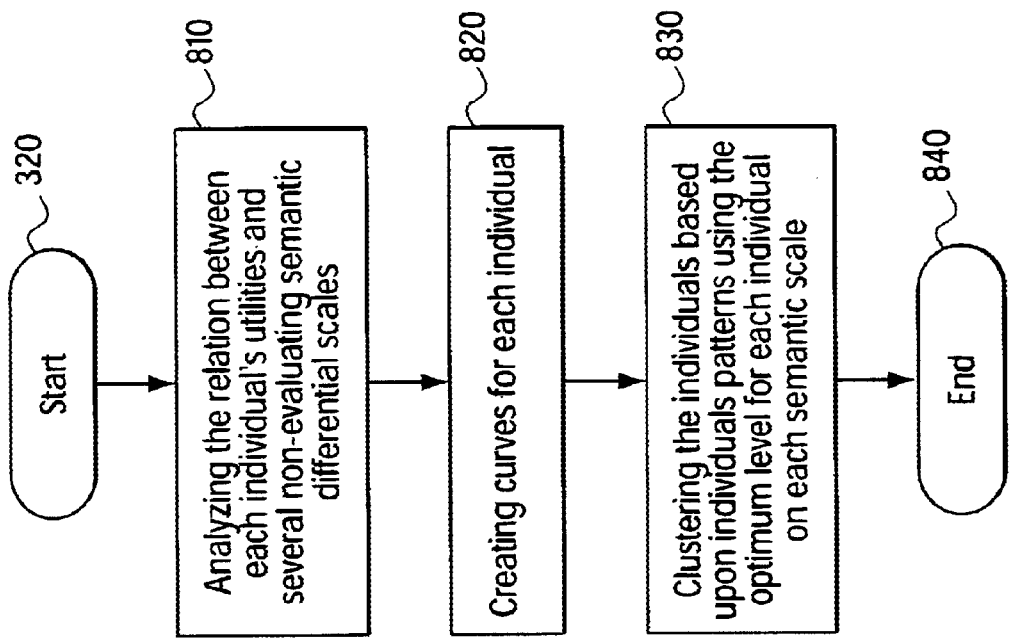
FIG. 7 shows a flow chart illustrating an exemplary method of a segmentation algorithm according to the present invention.

FIG. 7 shows an exemplary embodiment of a method according to the present invention for a segmentation algorithm. The segmentation algorithm may include three steps. In step 810, the software application for optimization 144*a* analyzes the relationship between each individual's utilities (one per concept element) and several (N) non-evaluative semantic differential scales. In step 820, the software application for optimization 144*a* creates N curves for each individual, relating the individuals utility values to each of the semantic scales. In step 830, the software application for optimization 144*a* clusters the individuals based upon the individual patterns, using as inputs the optimum level for each individual, on each semantic scale. The described above operation may be performed in advance of optimization on a separate computer (i.e., server). Of course, there may be other ways of segmenting or clustering the respondents.

Several embodiments of the present invention are specifically illustrated and/or described herein. However, it will be appreciated that modifications and variations of the present invention are covered by the above teachings and within the purview of the appended claims without departing from the spirit and intended scope of the present invention.

What is claimed is:

1. A data communication method, comprising the steps of:
    (a) transmitting a first request communication from a user computing arrangement to a first server arrangement via a communications network;
    (b) transmitting a second request communication from the first server arrangement to a second server arrangement, the second request communication including data representing at least one characteristic of a user of the user computing arrangement;
    (c) selecting one of a plurality of population segments in accordance with the at least one characteristic of the user;
    (d) determining a content in accordance with the population segment selected in the selecting step (c), the content corresponding to a combination of a plurality of concept elements;
    (e) transmitting a first response communication from the second server arrangement to the first server arrangement in response to the second request communication, the first response communication including data representing the content determined in the determining step (d); and
    (f) transmitting a second response communication from the first server arrangement to the user computing arrangement via the communications network in response to the first request communication, the second response communication including at least the content determined in the determining step (d) wherein the determining step (d) comprising the steps of:
        defining a plurality of predetermined content executions;
        selecting a plurality of respondents from each of the plurality of population segments;
        obtaining from each of the plurality of respondents an evaluation of the content executions;
        assigning the content executions to a respective one of the plurality of population segments; and
        determining, for each of the plurality of population segments, an optimization of the predetermined content executions in accordance with the evaluations obtained.

2. The method according to claim 1, wherein the content determining step (d) includes a substep of selecting one of a plurality of predetermined content executions.

3. The method according to claim 2, wherein the first response communication transmitting step (e) transmits data indicative of the selected one of a plurality of predetermined content executions from the second server arrangement to the first server arrangement.

4. The method according to claim 3, wherein the plurality of predetermined content executions is stored in a data storing device of the first server arrangement, the second response communication transmitting step (f) transmitting the selected predetermined content execution from the first server arrangement to the user computing device.

5. The method according to claim 3, wherein the plurality of predetermined content executions is stored in a data storing device of the second server arrangement, the first response communication transmitting step (e) transmitting the selected predetermined content execution from the second server arrangement to the first server arrangement, the second response communication transmitting step (f) transmitting the selected predetermined content execution from the first server arrangement to the user computing device.

6. The method according to claim 2, wherein the plurality of predetermined content executions includes a default content execution.

7. The method according to claim 1, wherein the content determining step (d) includes a substep of selecting appropriate individual elements corresponding to each of the plurality of concept elements.

8. The method according to claim 7, wherein the content determining step (d) includes a substep of assembling the selected individual elements to define the content.

9. The method according to claim 7, wherein the first response communication transmitting step (e) transmits data indicative of the selected individual elements from the second server arrangement to the first server arrangement.

10. The method according to claim 8, wherein each group of individual elements is stored in a data storing device of the first server arrangement, the second response communication transmitting step (f) transmitting the assembled content from the first server arrangement to the user computing device.

11. The method according to claim 8, wherein each group of individual elements is stored in a data storing device of the second server arrangement, the first response communication transmitting step (e) transmitting the assembled content from the second server arrangement to the first server arrangement, the second response communication transmitting step (f) transmitting the assembled content from the first server arrangement to the user computing device.

12. The method according to claim 1, further comprising the step of determining the at least one characteristic of the user, the user characteristic determining step including at least one of the steps of:
    obtaining a response from the user to each of at least one stimulus or question;
    obtaining an identifying code corresponding to the user; and
    identifying prior behavior of the user.

13. The method according to claim 12, wherein the prior behavior identifying step includes the step of transmitting data indicative of the user's prior behavior from the user computing device to at least one of the first server arrangement and the second server arrangement.

14. The method according to claim 1, further comprising the step of performing a conjoint measurement relating to a plurality of combinations of the concept elements, the content determined in the determining step (d) being determined in accordance with the conjoint measurement.

15. The method according to claim 14, wherein the conjoint measurement performing step includes a substep of obtaining normative information relating to a plurality of respondents and relating to the plurality of combinations of the concept elements.

16. The method according to claim 15, further comprising a step of defining the plurality of population segments in accordance with the conjoint measurement performed and normative information obtained.

17. The method according to claim 16, further comprising the steps of:
    defining a plurality of predetermined content executions, each of the predetermined content executions corresponding to a respective combination of the concept elements;
    assigning each of the respondents to one of the plurality of population segments;
    assigning each of the plurality of content executions to one of the plurality of population segments;

obtaining from each of the respondents an evaluation of the content execution assigned to the respondent's respective population segment; and for each population segment, determining an optimization of the predetermined content executions in accordance with the evaluations obtained.

18. The method according to claim 1, wherein the second request communication includes data representing a number of characteristics of the user, the content determined in the determining step (d) being determined in accordance with the number of characteristics of the user.

19. A computer-readable storing medium storing a set of instructions, the set of instructions capable of being executed by a processor arrangement to implement a data communication method, the method comprising the steps of:

(a) transmitting a first request communication from a user computing arrangement to a first server arrangement via a communications network;

(b) transmitting a second request communication from the first server arrangement to a second server arrangement, the second request communication including data representing at least one characteristic of a user of the user computing arrangement;

(c) selecting one of a plurality of population segments in accordance with the at least one characteristic of the user;

(d) determining a content in accordance with the population segment selected in the selecting step (c), the content corresponding to a combination of a plurality of concept elements;

(e) transmitting a first response communication from the second server arrangement to the first server arrangement in response to the second request communication, the first response communication including data representing the content determined in the determining step (d); and (f) transmitting a second response communication from the first server arrangement to the user computing arrangement via the communications network in response to the first request communication, the second response communication including at least the content determined in the determining step (d) wherein the determining step (d) comprising the steps of:

defining a plurality of predetermined content executions;

selecting a plurality of respondents from each of the plurality of population segments;

obtaining from each of the plurality of respondents an evaluation of the content executions;

assigning the content executions to a respective one of the plurality of population segments; and determining, for each of the plurality of population segments, an optimization of the predetermined content executions in accordance with the evaluations obtained.

20. The computer-readable storing medium according to claim 19, wherein the content determining step (d) includes a substep of selecting one of a plurality of predetermined content executions.

21. The computer-readable storing medium according to claim 20, wherein the first response communication transmitting step (e) transmits data indicative of the selected one of a plurality of predetermined content executions from the second server arrangement to the first server arrangement.

22. The computer-readable storing medium according to claim 21, wherein the plurality of predetermined content executions is stored in a data storing device of the first server arrangement, the second response communication transmitting step (f) transmitting the selected predetermined content execution from the first server arrangement to the user computing device.

23. The computer-readable storing medium according to claim 21, wherein the plurality of predetermined content executions is stored in a data storing device of the second server arrangement, the first response communication transmitting step (e) transmitting the selected predetermined content execution from the second server arrangement to the first server arrangement, the second response communication transmitting step (f) transmitting the selected predetermined content execution from the first server arrangement to the user computing device.

24. The computer-readable storing medium according to claim 20, wherein the plurality of predetermined content executions includes a default content execution.

25. The computer-readable storing medium according to claim 19, wherein the content determining step (d) includes a substep of selecting appropriate individual elements corresponding to each of the plurality of concept elements.

26. The computer-readable storing medium according to claim 25, wherein the content determining step (d) includes a substep of assembling the selected individual elements to define the content.

27. The computer-readable storing medium according to claim 25, wherein the first response communication transmitting step (e) transmits data indicative of the selected individual elements from the second server arrangement to the first server arrangement.

28. The computer-readable storing medium according to claim 26, wherein each group of individual elements is stored in a data storing device of the first server arrangement, the second response communication transmitting step (f) transmitting the assembled content from the first server arrangement to the user computing device.

29. The computer-readable storing medium according to claim 26, wherein each group of individual elements is stored in a data storing device of the second server arrangement, the first response communication transmitting step (e) transmitting the assembled content from the second server arrangement to the first server arrangement, the second response communication transmitting step (f) transmitting the assembled content from the first server arrangement to the user computing device.

30. The computer-readable storing medium according to claim 19, wherein the method further comprises the step of determining the at least one characteristic of the user, the user characteristic determining step including at least one of the steps of:

obtaining a response from the user to each of at least one stimulus or question;

obtaining an identifying code corresponding to the user; and identifying prior behavior of the user.

31. The computer-readable storing medium according to claim 30, wherein the prior behavior identifying step includes the step of transmitting data indicative of the user's prior behavior from the user computing device to at least one of the first server arrangement and the second server arrangement.

32. The computer-readable storing medium according to claim 19, wherein the method further comprises the step of performing a conjoint measurement relating to a plurality of combinations of the concept elements, the content determined in the determining step (d) being determined in accordance with the conjoint measurement.

33. The computer-readable storing medium according to claim 32, wherein the conjoint measurement performing step includes a substep of obtaining normative information relating to a plurality of respondents and relating to the plurality of combinations of the concept elements.

34. The computer-readable storing medium according to claim 33, wherein the method further comprises a step of defining the plurality of population segments in accordance with the conjoint measurement performed and normative information obtained.

35. The computer-readable storing medium according to claim 34, wherein the method further comprises the steps of:
   defining a plurality of predetermined content executions, each of the predetermined content executions corresponding to a respective combination of the concept elements;
   assigning each of the respondents to one of the plurality of population segments;
   assigning each of the plurality of predetermined content executions to one of the plurality of population segments;
   obtaining from each of the respondents an evaluation of the predetermined content execution assigned to the respondent's respective population segment; and
   for each population segment, determining an optimization of the predetermined content executions in accordance with the evaluations obtained.

36. The computer-readable storing medium according to claim 19, wherein the second request communication includes data representing a number of characteristics of the user, the content determined in the determining step (d) being determined in accordance with the number of characteristics of the user.

37. A computer system, comprising:
   a first server arrangement;
   a second server arrangement
   at least one user computing arrangement; and
   a data communication method comprising the steps of:
      (a) transmitting a first request communication from the user computing arrangement to the first server arrangement via a communications network;
      (b) transmitting a second request communication from the first server arrangement to the second server arrangement, the second request communication including data representing at least one characteristic of a user of the user computing arrangement;
      (c) selecting one of a plurality of population segments in accordance with the at least one characteristic of the user;
      (d) determining a content in accordance with the data representing the at least one characteristic of the user, the content corresponding to a combination of a plurality of concept elements; and
      (e) transmitting a first response communication from the second server arrangement to the first server arrangement in response to the second request communication, the first response communication including data representing the content determined in the determining step (d);
      (f) transmitting a second response communication from the first server arrangement to the user computing arrangement via the communications network in response to the first request communication, the second response communication including at least the content determined in the determining step (d) wherein the determining step (d) comprising the steps of:
         defining a plurality of predetermined content executions;
         selecting a plurality of respondents from each of the plurality of population segments;
         obtaining from each of the plurality of respondents an evaluation of the content executions;
         assigning the content executions to a respective one of the plurality of population segments; and
         determining, for each of the plurality of population segments, an optimization of the predetermined content executions in accordance with the evaluations obtained.

38. The computer system according to claim 37, wherein the content determining step (d) includes a substep of selecting one of a plurality of predetermined content executions.

39. The computer system according to claim 38, wherein the first response communication transmitting step (e) transmits data indicative of the selected one of a plurality of predetermined content executions from the second server arrangement to the first server arrangement.

40. The computer system according to claim 39, wherein the plurality of predetermined content executions is stored in a data storing device of the first server arrangement, the second response communication transmitting step (f) transmitting the selected predetermined content execution from the first server arrangement to the user computing device.

41. The computer system according to claim 39, wherein the plurality of predetermined content executions is stored in a data storing device of the second server arrangement, the first response communication transmitting step (e) transmitting the selected predetermined content execution from the second server arrangement to the first server arrangement, the second response communication transmitting step (f) transmitting the selected predetermined content execution from the first server arrangement to the user computing device.

42. The computer system according to claim 38, wherein the plurality of predetermined content executions includes a default content execution.

43. The computer system according to claim 37, wherein the content determining step (d) includes a substep of selecting appropriate individual elements corresponding to each of the plurality of concept elements.

44. The computer system according to claim 43, wherein the content determining step (d) includes a substep of assembling the selected individual elements to define the content.

45. The computer system according to claim 44, wherein each group of individual elements is stored in a data storing device of the first server arrangement, the second response communication transmitting step (f) transmitting the assembled content from the first server arrangement to the user computing device.

46. The computer system according to claim 43, wherein the first response communication transmitting step (e) transmits data indicative of the selected individual elements from the second server arrangement to the first server arrangement.

47. The computer system according to claim 44, wherein each group of individual elements is stored in a data storing device of the second server arrangement, the first response communication transmitting step (e) transmitting the assembled content from the second server arrangement to the first server arrangement, the second response communication transmitting step (f) transmitting the assembled content from the first server arrangement to the user computing device.

48. The computer system according to claim 37, wherein the method further comprises the step of determining the at least one characteristic of the user, the user characteristic determining step including at least one of the steps of:
- obtaining a response from the user to each of at least one stimulus or question;
- obtaining an identifying code corresponding to the user; and
- identifying prior behavior of the user.

49. The computer system according to claim 48, wherein the prior behavior identifying step includes the step of transmitting data indicative of the user's prior behavior from the user computing device to at least one of the first server arrangement and the second server arrangement.

50. The computer system according to claim 37, wherein the method further comprises the step of performing a conjoint measurement relating to a plurality of combinations of the concept elements, the content determined in the determining step (d) being determined in accordance with the conjoint measurement.

51. The computer system according to claim 50, wherein the conjoint measurement performing step includes the substep of obtaining normative information relating to a plurality of respondents and relating to the plurality of combinations of the concept elements.

52. The computer system according to claim 51, wherein the method further comprises the step of defining the plurality of population segments in accordance with the conjoint measurement performed and normative information obtained.

53. The computer system according to claim 52, wherein the method further comprises the steps of:
- defining a plurality of predetermined content executions, each of the predetermined content executions corresponding to a respective combination of the concept elements;
- assigning each of the respondents to one of the plurality of population segments;
- assigning each of the plurality of predetermined content executions to one of the plurality of population segments;
- obtaining from each of the respondents an evaluation of the predetermined content execution assigned to the respondent's respective population segment; and
- for each population segment, determining an optimization of the predetermined content executions in accordance with the evaluations obtained.

54. The computer system according to claim 37, wherein the second request communication includes data representing a number of characteristics of the user, the content determined in the determining step (d) being determined in accordance with the number of characteristics of the user.

55. A computer system, comprising:
- a user computing arrangement;
- a first server arrangement; and
- a second server arrangement;
- wherein the user computing arrangement is configured to transmit a first request communication to the first server arrangement via a communications network;
- wherein the first server arrangement is configured to transmit a second request communication to the second server arrangement, the second request communication including data representing at least one characteristic of a user of the user computing arrangement;
- wherein the second server arrangement is configured to select one of a plurality of population segments in accordance with the at least one characteristic of the user;
- wherein the second server arrangement is further configured to determine a content in accordance with the population segment selected, the content corresponding to a combination of a plurality of concept elements;
- wherein the second server arrangement is further configured to transmit a first response communication to the first server arrangement in response to the second request communication, the first response communication including data representing the content determined by the second server arrangement;
- wherein the first server arrangement is further configured to transmit a second response communication to the user computing arrangement via the communications network in response to the first request communication, the second response communication including at least the content determined by the second server arrangement wherein the second server arrangement is further configured to:
  - define a plurality of predetermined content executions;
  - select a plurality of respondents from each of the plurality of population segments;
  - obtain from each of the plurality of respondents an evaluation of the content executions;
  - assign the content executions to a respective one of the plurality of population segments; and
  - determine, for each of the plurality of population segments, an optimization of the predetermined content executions in accordance with the evaluations obtained.

56. The computer system according to claim 55, wherein the second server arrangement is configured to determine the content by selecting one of a plurality of predetermined content executions.

57. The computer system according to claim 56, wherein the first response communication includes data indicative of the selected one of the plurality of predetermined content executions.

58. The computer system according to claim 57, wherein the first server arrangement includes a data storing device, the plurality of predetermined content executions being stored in the data storing device, the second response communication including the selected one of plurality of predetermined content executions.

59. The computer system according to claim 58, wherein the second server arrangement is configured to define the plurality of population segments in accordance with the conjoint measurement and the normative information.

60. The computer system according to claim 59, wherein the second server arrangement is configured to define a plurality of predetermined content executions, each of the predetermined content executions corresponding to a respective combination of the concept elements;
- wherein the second server arrangement is configured to assign each of the respondents to one of the plurality of population segments;
- wherein the second server arrangement is configured to assign each of the plurality of predetermined content executions to one of the plurality of population segments;
- wherein the second server arrangement is configured to obtain from each of the respondents an evaluation of the predetermined content execution assigned the respondent's respective population segment; and
- wherein the second server arrangement is configured to determine, for each population segment, an optimization of the predetermined content executions in accordance with the evaluations obtained.

61. The computer system according to claim 56, wherein the plurality of predetermined content executions includes a default content execution.

62. The computer system according to claim 57, wherein second server arrangement includes a data storing device, the plurality of predetermined content executions being stored in the data storing device, the first response communication including the selected one of the plurality of predetermined content executions and the second response communication including the selected one of the plurality of predetermined content executions.

63. The computer system according to claim 57, wherein the conjoint measurement performed includes obtaining normative information relating to a plurality of respondents and relating to the plurality of combinations of the concept elements.

64. The computer system according to claim 55, wherein the second server arrangement is configured to select appropriate individual elements corresponding to each of the plurality of concept elements.

65. The computer system according to claim 64, wherein at least one of the first server arrangement and the second server arrangement is configured to assemble the selected individual elements to define the content.

66. The computer system according to claim 65, wherein the first server arrangement includes a data storing device, each group of individual elements being stored in the data storing device, first server arrangement being configured to assemble the selected individual elements to define the content, the second response communication including the assembled selected individual elements.

67. The computer system according to claim 64, wherein the first response communication includes data indicative of the selected individual elements.

68. The computer system according to claim 65, wherein the second server arrangement includes a data storing device, each group of individual elements being stored in the data storing device, the second server arrangement being configured to assemble the selected individual components to define the content, the first response communication including the assembled selected individual elements and the second response communication including the assembled selected individual components.

69. The computer system according to claim 55, wherein at least one of the first server arrangement and the second server arrangement is configured to determined the at least one characteristic of the user in accordance with at least one of:

a response received from the user to at least one stimulus or question;

an identifying code corresponding to the user; and a prior behavior of the user.

70. The computer system according to claim 69, wherein the user computing device is configured to transmit data indicative of the user's prior behavior to at least one the first server arrangement and the second server arrangement.

71. The computer system according to claim 55, wherein the second server arrangement is configured to perform a conjoint measurement relating to a plurality of combinations of the concept elements, the content being determined in accordance with the conjoint measurement.

72. The computer system according to claim 55, wherein the second request communication includes data representing a number of characteristics of the user, the content determined in the determining step (d) being determined in accordance with the number of characteristics of the user.

* * * * *